(12) United States Patent
Swerup (10) Patent No.: US 7,697,675 B2
(45) Date of Patent: Apr. 13, 2010

(54) MULTIPARTY CALL OF PORTABLE DEVICES WITH PARTY POSITIONING IDENTIFICATION

(75) Inventor: Jan Swerup, Nacka (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1068 days.

(21) Appl. No.: 10/571,509

(22) PCT Filed: Sep. 8, 2004

(86) PCT No.: PCT/EP2004/010011

§ 371 (c)(1),
(2), (4) Date: Mar. 10, 2006

(87) PCT Pub. No.: WO2005/025250

PCT Pub. Date: Mar. 17, 2005

(65) Prior Publication Data

US 2007/0041547 A1  Feb. 22, 2007

Related U.S. Application Data

(60) Provisional application No. 60/504,766, filed on Sep. 22, 2003.

(30) Foreign Application Priority Data

Sep. 11, 2003  (EP) .................................. 03020682

(51) Int. Cl.
*H04M 3/42* (2006.01)

(52) U.S. Cl. ............................. 379/202.01; 348/14.01; 348/14.08; 370/328; 379/355.09

(58) Field of Classification Search ............ 379/202.01, 379/355.09; 370/267, 328; 455/404.1, 414.1, 455/446, 456.1, 556.1; 704/270; 348/14.01, 348/14.08

See application file for complete search history.

(56) References Cited

U.S. PATENT DOCUMENTS

| 6,330,022 B1 | 12/2001 | Seligmann ................ 348/14.08 |
| 6,366,771 B1 * | 4/2002 | Angle et al. .............. 455/414.1 |
| 6,434,126 B1 * | 8/2002 | Park ........................... 370/328 |
| 6,462,767 B1 | 10/2002 | Obata et al. .............. 348/14.08 |

(Continued)

FOREIGN PATENT DOCUMENTS

EP  0808048  11/1997

(Continued)

OTHER PUBLICATIONS

Form PCT/ISA/210, International Search Report dated Nov. 22, 2004, corresponding to PCT Application No. PCT/EP2004/010011.

*Primary Examiner*—Gerald Gauthier
(74) *Attorney, Agent, or Firm*—Myers Bigel Sibley & Sajovec, P.A.

(57) ABSTRACT

A portable communication device engages in voice communication with a plurality of parties by establishing connections between the portable communication device and at least two other parties, positioning the other connected parties at different positions in space in relation to the portable communication device, and providing information in relation to the position of one of the other connected parties when this connected party provides audio information over the connection so that the user of the device can identify which party is active.

23 Claims, 3 Drawing Sheets

U.S. PATENT DOCUMENTS

| | | | |
|---|---|---|---|
| 6,628,767 B1 * | 9/2003 | Wellner et al. | 379/202.01 |
| 6,812,954 B1 * | 11/2004 | Priestman et al. | 348/14.01 |
| 6,853,716 B1 * | 2/2005 | Shaffer et al. | 379/202.01 |
| 7,043,256 B2 * | 5/2006 | Ozugur et al. | 455/456.1 |
| 7,096,037 B2 * | 8/2006 | Canova et al. | 455/556.1 |
| 7,203,497 B2 * | 4/2007 | Belcea | 455/446 |
| 7,231,205 B2 * | 6/2007 | Guyot et al. | 455/414.1 |
| 7,283,846 B2 * | 10/2007 | Spriestersbach et al. | 455/566 |
| 7,477,905 B2 * | 1/2009 | George | 455/456.1 |
| 7,483,400 B2 * | 1/2009 | Kuusinen et al. | 370/267 |
| 2002/0090953 A1 * | 7/2002 | Aburai et al. | 455/456 |
| 2003/0125954 A1 * | 7/2003 | Bradley et al. | 704/270 |
| 2004/0203569 A1 * | 10/2004 | Jijina et al. | 455/404.1 |
| 2006/0046699 A1 * | 3/2006 | Guyot et al. | 455/414.1 |
| 2006/0148488 A1 * | 7/2006 | Syrbe | 455/456.1 |
| 2007/0081075 A1 * | 4/2007 | Canova et al. | 348/14.08 |

FOREIGN PATENT DOCUMENTS

| | | |
|---|---|---|
| WO | WO 00/13336 A | 3/2000 |
| WO | WO 03/010986 A1 | 2/2003 |

* cited by examiner

MULTIPARTY CALL OF PORTABLE DEVICES WITH PARTY POSITIONING IDENTIFICATION

RELATED APPLICATIONS

The present application is a 35 U.S.C. §371 national phase application of PCT International Application No. PCT/EP2004/010011, having an international filing date of Sept. 8, 2004 and claiming priority to European Patent Application No. 03020682.5, filed Sept. 11, 2003 and U.S. Provisional Application No. 60/504,766 filed Sept. 22, 2003, the disclosures of which are incorporated herein by reference in their entireties. The above PCT International Application was published in the English language and has International Publication No. WO 2005/025250.

TECHNICAL FIELD OF THE INVENTION

The present invention relates to party positioning during voice communication between several parties. More particularly it relates to a portable communication device, a method for engaging the portable communication device in voice communication with other parties, a communication connection device to be engaged in voice communication and a system for engaging the portable communication device in voice communication using the communication connection device, with other parties.

DESCRIPTION OF RELATED ART

Along with the development of the technology in telecommunications, cellular networks are being presented that have higher and higher available bandwidth. This results in more and more of that type of functionality possible to provide in portable communication device such as mobile phones. One such functionality is the ability to simultaneously or virtually simultaneously communicate with several other parties at the same time.

However, when providing this type of functionality in a portable communication device, it is at times difficult to recognize which party is speaking, when a multiple of parties are participating. It is at times thus not possible to identify one party and differentiating him from another party.

It would be an advantage to easily being able to identify who is saying what, during a conference or a multiparty call.

There is thus a need for providing a device and a method for achieving easy identification and differentiation of parties participating in a conference call or a multiparty call.

SUMMARY OF INVENTION

The invention is thus directed towards solving the problem of easily identifying who is saying what during a conference call, in relation to a portable communication device.

This is achieved by positioning of parties in space and providing information in relation to the position of the party that is active, so that a user more easily can identify which party is active.

A first object of the present invention is to provide a method for engaging a portable communication device with a number of parties in voice communication, with which a user of said portable communication device more easily can determine who is being active and distinguish one party from another.

According to one aspect of this invention, this object is achieved by a method for engaging a portable communication device In voice communication with a number of parties, comprising the steps of establishing connections between the portable communication device and at least two other parties, positioning the other connected parties at different positions in space in relation to the portable communication device, and providing information in relation to the position of one of the other connected parties, when this connected party provides audio information over said connection, so that the user of the device can more easily identify which party is active.

This aspect of the present invention has the advantage that the user of the device can more easily identify which party is active.

A second aspect of the present invention is directed towards a method including the features of the first aspect, further comprising the step of: detecting selection of a position of one of the other parties through inputs made by a user of the portable communication device.

A third aspect of the present invention is directed towards a method including the features of the first aspect, in which the step of positioning comprises positioning in visual space.

A fourth aspect of the present invention is directed towards a method including the features of the first aspect, in which the step of providing information, comprises providing visual information on a screen.

A fifth aspect of the present Invention is directed towards a method including the features of the first aspect, in which the step of providing information includes providing a representation that can be associated with said one of the other parties, when said other party provides audio information over said connection.

A sixth aspect of the present invention is directed towards a method including the features of the fourth aspect, in which the step of providing information in visual space, comprises providing text and/or image information.

A seventh aspect of the present invention is directed towards a method including the features of the fifth aspect, in which the step of providing information, comprises providing information for actuating the provided representation.

An eighth aspect of the present invention is directed towards a method including the features of the sixth aspect, in which the step of providing information, comprises providing information for actuating the provided representation.

A ninth aspect of the present invention is directed towards a method including the features of the first aspect, in which the step of positioning comprises positioning in audio space.

A tenth aspect the present invention is directed towards a method including the features of the ninth aspect, in which the step of providing information includes providing audio information from said one of the other connected parties processed, based on inputs made by a user, such that the processed audio information is perceived as being positioned in space at said other party when presented by the information presentation unit.

An eleventh aspect of the present invention is directed towards a method including the features of the ninth aspect, in which the step of positioning comprises determining control information to be used when providing processing audio information.

A twelfth aspect of the present invention is directed towards a method including the features of the tenth aspect, in which the step of providing audio information in space, includes processing said audio information of one of the other parties, such that the processed audio information is perceived as being positioned in space at the position of said other party when presented by the information presentation unit.

A thirteenth aspect the present invention is directed towards a method including the features of the twelfth aspect, in which the step of providing audio information including processing of audio information, includes weighting of two audio streams of said audio information, such that the processed audio information is perceived as being positioned in space at the position of said other party when presented by the information presentation unit.

A fourteenth aspect of the present invention is directed towards a method including the features of the twelfth aspect, further comprising the steps of providing audio information from the portable communication device to at least one of the other parties and processing said audio information including equal weighting of two audio streams of said audio information.

A second object of the present invention is to provide a portable communication device with which a user can engage in voice communication with a number of parties, and more easily determine who is being active and distinguish one party from another.

According to a fifteenth aspect of this invention, this object is achieved by a portable communication device arranged to engage in voice communication with a number of parties, comprising: a communication unit for engaging at least two other parties in voice communication, a user input unit, arranged to receive user inputs, a control unit, arranged to enable positioning of the other connected parties at different positions in space, in dependence of inputs from a user on the user input unit, at least one information presentation unit, for which the control unit further is arranged to provide information in relation to the position of one of the other connected parties, when said one of the other connected parties is providing audio information over a connection, so that the user of the device can more easily identify which party is active.

A sixteenth aspect of the present invention is directed towards a portable communication device including the features of the fifteenth aspect, in which the control unit further is arranged to detect selection, via the user input unit, of a position of one of the other connected parties.

A seventeenth aspect of the present Invention is directed towards a portable communication device including the features of the fifteenth aspect, in which the control unit, when positioning the other connected parties, is arranged to determine control information enabling positioning in audio space, for provision of audio information to be perceived as being positioned at the position of said one of the other connected parties, in space.

An eighteenth aspect of the present invention is directed towards a portable communication device including the features of the seventeenth aspect, further comprising an audio processing unit, arranged to process the audio information from said one of the other connected parties, based on the control information, and forward the processed audio information to at least one information presentation unit, such that the audio information is perceived as being positioned at the position in space of said party, when presented by the at least one information presentation unit.

A nineteenth aspect of the present invention is directed towards a portable communication device including the features of the eighteenth aspect, wherein the audio processing unit when being arranged to process the audio information, processes the information so that two differently processed audio streams of said audio information is provided.

A twentieth aspect of the present invention is directed towards a portable communication device including the features of the seventeenth aspect, wherein the communication unit is further arranged to forward said control information to an external processing unit, for processing audio information from said one of the other connected parties, said communication unit is being arranged to receive the processed audio information and forward, after possible further processing, said processed audio information to an information presentation unit, in a format allowing the audio information to be perceived as being positioned at the position in space of said one of the other parties, when presented by the at least one information presentation unit.

A twenty-first aspect of the present invention is directed towards a portable communication device including the features of the seventeenth aspect, wherein the at least one information presentation unit, comprises at least two speakers, wherein the perceived position in space, of said one of the other connected parties, is related to the positions of the speakers.

A twenty-second aspect of the present invention is directed towards a portable communication device including the features of the fifteenth aspect, in which the control unit, when locating the other connected parties, is arranged to determine control information enabling positioning in visual space, for provision of visual information perceived to be at the position in space of said one of the other connected parties.

A twenty-third aspect of the present invention is directed towards a portable communication device including the features of the twenty-second aspect, in which the control unit further is arranged to determine control information for presenting a representation of said one of the other connected parties, by using said at least one information presentation unit.

A twenty-fourth aspect of the present invention is directed towards a portable communication device including the features of the twenty-third aspect, in which the control information comprises information for actuating the representation of said one of the other connected parties, by using said at least one information presentation unit.

A twenty-fifth aspect of the present invention is directed towards a portable communication device including the features of the fifteenth aspect, wherein the at least one information presentation unit comprises a screen.

A twenty-sixth aspect of the present invention is directed towards a portable communication device including the features of the fifteenth aspect, wherein the user input unit comprises a screen, which screen allows the user to input information in the form of "drag and drop".

A third object of the present invention is to provide a communication connection device arranged to be engaged In voice communication between a portable communication device and a number of parties, so that a user of the portable communication device more easily can determine who is being active and distinguish one party from another.

According to a twenty-seventh aspect of this invention, this object is achieved by a communication connection device arranged to assist voice communications between at least one portable communication device and at least two other parties, wherein said portable communication device receives user Inputs, establishes connections between the portable communication device and said other parties, detects selections of positions of the other parties, and determines control information based on the detected selection of position of the other parties from a user, enabling positioning in audio space, said communication connection device comprises: a transceiving unit, arranged to receive the control information, an audio processing unit, arranged to process, based on the control information received by the transceiving unit from the portable communication device, the audio information of one of the other connected parties when said party is providing audio information, said transceiving unit, further being arranged to send such processed audio information to the portable communication device, in a format allowing the audio information to be presented such that it is perceived as being positioned at the position in space of said one of the other parties.

A fourth object of the present invention is to provide a communication system for engaging a portable communication device in voice communication with other parties, via a communication connection device, so that a user of the portable communication device more easily can determine who is being active and distinguish one party from another.

According to a twenty-eighth aspect of this invention, this object is achieved by a communication system comprising: at least one portable communication device; at least two other communication parties; at least one communication connection device, in which system the at least one portable communication device is arranged to engage in voice communication with at least the two other communication parties of the system, said at least one portable communication device comprising: a communication unit for engaging the at least two other communication parties in voice communication in said system, a user input unit, arranged to receive user inputs, a control unit, arranged to determine control information enabling positioning of the other connected parties of the system at different positions in space, in dependence of inputs from a user on the user input unit, and at least one information presentation unit, for which the control unit further is arranged to provide processed audio information in relation to the position of one of the other connected parties, when said one of the other connected parties is providing audio information over a connection, in which system, said at least one communication connection comprising: a transceiving unit, arranged to receive the control information, an audio processing unit, arranged to process the audio information of one of the other connected parties when said party is providing audio information, based on the control information received by the transceiving unit from the portable communication device, said transceiving unit, further being arranged to send such processed audio information to the portable communication device, in a format allowing the audio information to be presented such that it is perceived as being positioned at the position in space of said one of the other parties.

It should be emphasized that the term "comprises/comprising" when used in this specification is taken to specify the presence of stated features, integers, steps or components, but does not preclude the presence or addition of one or more other features, integers, steps, components or groups thereof.

The present invention has the following advantages:

By using a portable communication device according to the present invention, the user can more easily follow who is saying what, in conference calls and in multiparty calls.

The user of a portable conference device can identify the party being active.

The network operator receives higher revenues as calls are charged as many calls since several lines are being used.

The portable communication device can be used instead of a video conferencing equipment that is expensive, is heavier, is stationary and demands much more of space.

The invention circumvents the need of a conference bridge or the calling a conference service setting up the conference call. This enables cheaper and more secure in-house conference calls.

BRIEF DESCRIPTION OF THE DRAWINGS

The present invention will now be described in more detail in relation to the enclosed drawings, in which.

DETAILED DESCRIPTION OF THE EMBODIMENTS

The present invention relates to provision of a portable communication device and a method for engaging the portable communication device in voice communication with other parties, a communication connection device to be engaged in voice communication and a system for engaging the portable communication device in voice communication with said other parties.

Figure 1:
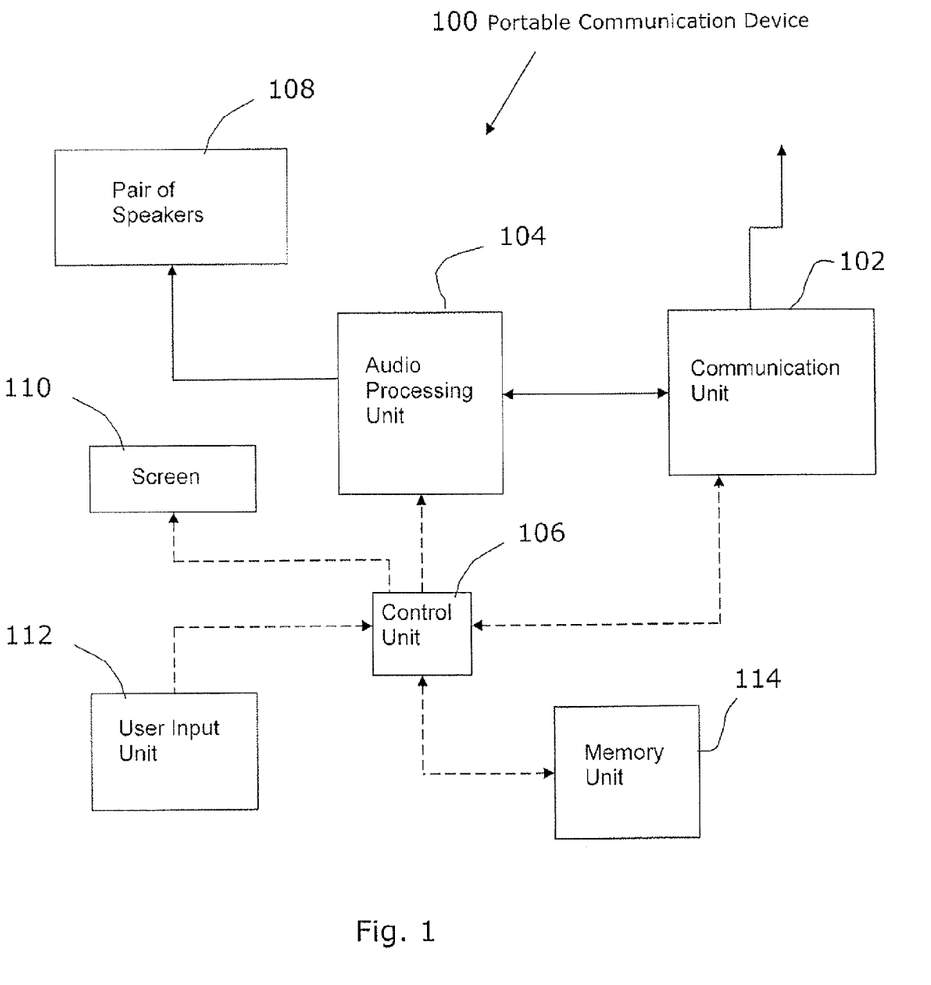
FIG. 1 shows a schematic representation of a portable communication device according to the present invention.

Reference will now be given to FIG. 1 showing a schematic representation of a portable communication device, 100, according to a preferred embodiment of the invention. The portable communication device, 100, comprises a communication unit, 102, for communication with other connected parties and sending and receiving information to and from, respectively, said other parties. The portable communication device also comprises an audio processing unit, 104, for processing audio information from the connected parties, based on control information from a control unit, 106, that further controls the audio processing unit, 104, which processing unit is connected to a first information presentation unit in the form of a pair of speakers, 108, for presenting audio information. The control unit, 106, is also connected to a second information presentation unit, in the form of a screen, 110, for presenting visual information related to the audio information. From a user input unit, 112, that can be in the form of keys, a key pad, a touch screen, thumb wheel, etc. a user controls the portable communication device, 100. A memory unit, 114, containing program information and party contact information, is connected to the control unit, 106.

Figure 2:
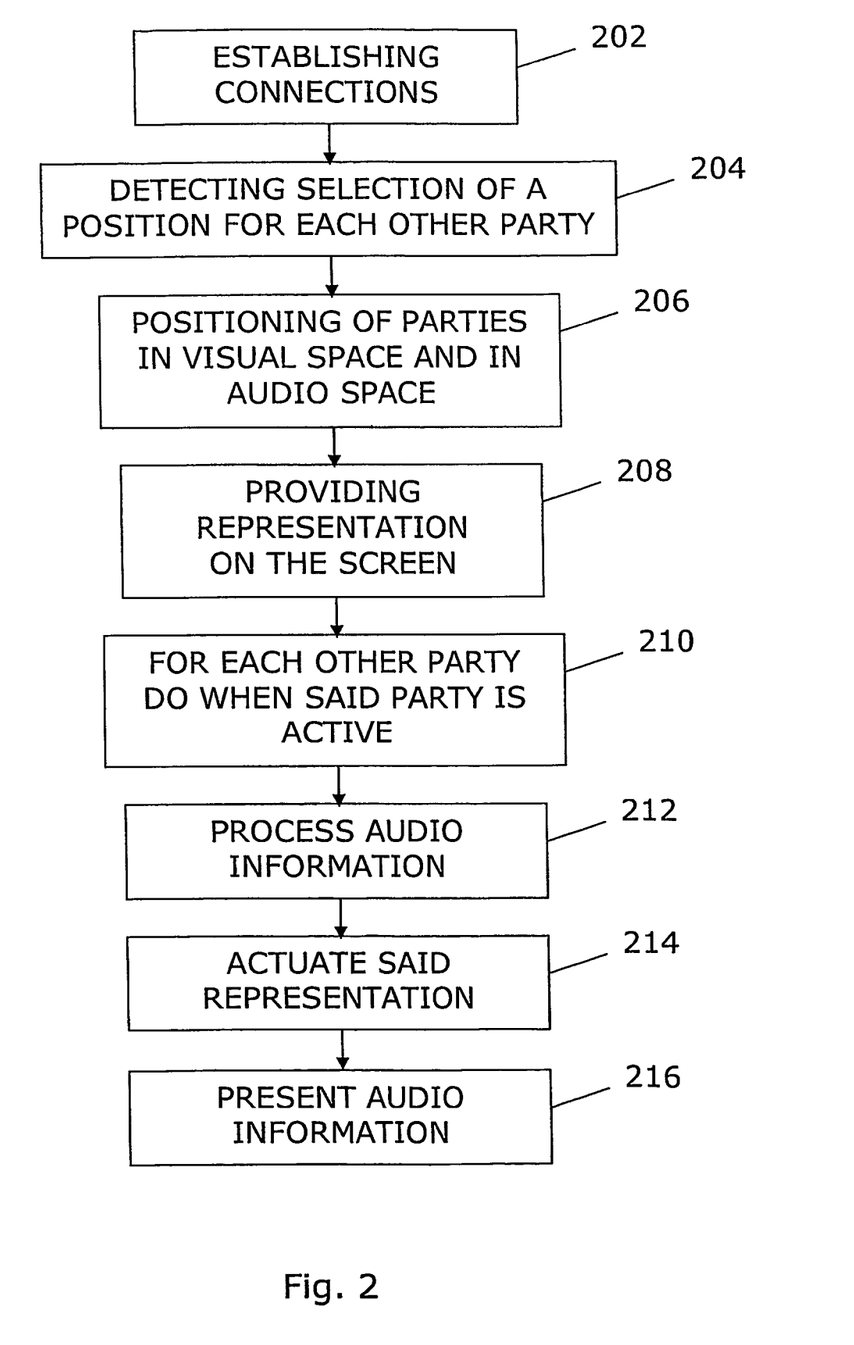
FIG. 2 shows a flow chart of a method for engaging a portable communication device in voice communications with at least two other parties according to one preferred embodiment of the present invention.

The method for engaging a portable communication device with at least two other parties in voice communication according to the present invention, will now be described in relation to FIG. 1 and FIG. 2, where the latter shows a flow chart of said method.

A user of the portable communication device chooses for instance a conference mode of the device and selects the parties with which the user would like to communicate. For each party a representation of said party, for instance in the form of a picture or a head of said party, a name, or an object that is associated with that party, is presented on a screen of the portable communication device. According to the present invention, these representations are positioned around a conference table on the screen with a representation of the user of the portable communication device in front of said table and representations in form of pictures of the participating parties of said conference distributed around said table. The user receives a default distribution of said representations on the screen and he can then also change the position of each representation by a drag and drop function. As an alternative, this change in position can also be made by using a key, a thumb-wheel or the like. The user can hence position the representations on the screen around the conference table according to his will and preference. Also a selection of a background, different from the conference background, can be made by the user, according to his preference. The user has hence an option to change the conference background by selecting another preset background from a selection as presented on the screen. The visual environment of representation of the participating users can thus be tailored by the user of the portable communication device to appropriately match with the participating parties and/or the matter to be discussed.

As indicated above, the representations of the parties are selected by the user. One preferred representation of each party is a picture of said party, which picture can be accessed from the contact memory unit of the portable communication device. Contact information contained in said contact memory unit, including pictures, can of course at any time, prior to or in relation to, the conference call, be distributed to the each or a sub set of parties by for instance using MMS messages.

In the method according to the present invention, the portable communication device, 100, establishes a connection with two other parties, step 202, as a result of a user using the user input unit, 112. This connection is for instance a single duplex connection between the portable communication device and each of the two other participating parties. Here the user can hear both of the other parties at the same time and they can hear him at all times.

The control unit, 106, of the portable communication device, 100, then detects selection of a position for each one of said other connected parties, step 204, based on inputs made by a user. The selection is performed In the earlier described default position or in changed positions. Upon this selection of positions, according to this preferred embodiment, the control unit, 106, in the portable communication device, 100, positions the other connected parties in visual space as well as in audio space, step 206. The positioning in audio space, is enabled by the determination of control information by the control unit, 106, In this step, step 206. This control information will be found later on, to be necessary for the audio processing. The control unit, 106, of the portable communication device, 100, then provides a representation of each connected party on the second information presentation unit, being in the form of the screen, 110, step 208. For each and every other connected party, whenever said party is active, i.e. whenever it is providing audio information, the audio processing unit, 104, of the portable communication device, 100, processes the audio information from said active party, step 212, based on control information received from the control unit, 106.

According to the preferred embodiment this audio processing involves dividing the audio information in two audio streams and process these streams according to the control information received by the control unit, 106. A preferred processing involves amplitude modulating of said two streams by for Instance weighting said two streams and/or delaying one or the other of said two streams in relation to each other. Audio processing involving amplitude modulating and/or delaying of the divided streams of the received audio information is the key for enabling perception of the processed audio information as being positioned at a position of said one active party of said other connected parties.

The control unit, 106, then sends control information to the screen, 110, and actuates the representation of the party being active, step 214, and presents audio information, step 216, by using the pair of speakers, 108, such that the audio information is perceived as being positioned at the position of said one active connected party of the other connected parties. This pair of speakers is in this preferred embodiment a head set, to be used by the user of the portable communication device. Other forms of speakers are also possible such as speakers built in into the portable communication device, mounted on for instance the clothes of the user, speakers external to the portable communication device positioned on a physical table, etc. The actuation of the representation of the party being active is In this preferred embodiment actuation of pictures into "talking heads", i.e. a picture of a head with moving lips, according to a known method such that the movement of the lips is synchronized with the audio information provided on the two speakers. Other forms of actuations are also possible such as shaking the representations, zooming in or "up-animation" of the representation of the active party, or by using other animation effects, changing colour or size of the representation, high-lighting text, etc.

The user of the portable communication device, 100, hence sees an actuated representation of a party at a selected visual position on the screen, 110, and perceives the audio information to be provided at a related position, in audio space, provided by the two speakers, 108. The user can thus more easily Identify which party is active, since the audio information from said party is perceived as being located at a position of the actuated representation of said party, on the screen, 110.

By providing a visual actuated representation positioned at a visual position of the party being active at the same time as providing audio information that is perceived as being positioned at a position in audio space, where said visual position and said audial position are related, i.e. the visual representation is shown to the right of the screen and the audio information is perceived as being positioned to the right in audio space, by using the head set according to the preferred embodiment of the present invention, the user of the portable communication device has the advantage of easily distinguishing which party is active. The user has also the advantage of easily identifying the active party, since a representation of him is present. In the case a representation related to connected party is missing, a default representation is being used.

According to this preferred embodiment the portable communication device, 100, connects all other parties that are engaged in the voice communication to individual audio channels. The control unit, 106, of said portable communication device, 100, determines on which audio channel the communication unit, 102, receives audio information from a party, and hence determines from which party the audio information originates. By having access to a multiple of audio channels, the control unit, 106, can hence determine which party is active.

According to this preferred embodiment the voice generated by the user of the portable communication device, 100, is also processed by the audio processing unit, 104, before being transmitted by the communication unit, 102. However, the processing of this audio stream, to be transmitted, involves processing a single audio stream and hence does not involve dividing said audio information in dual streams, according to this preferred embodiment of the present invention.

Figure 3:
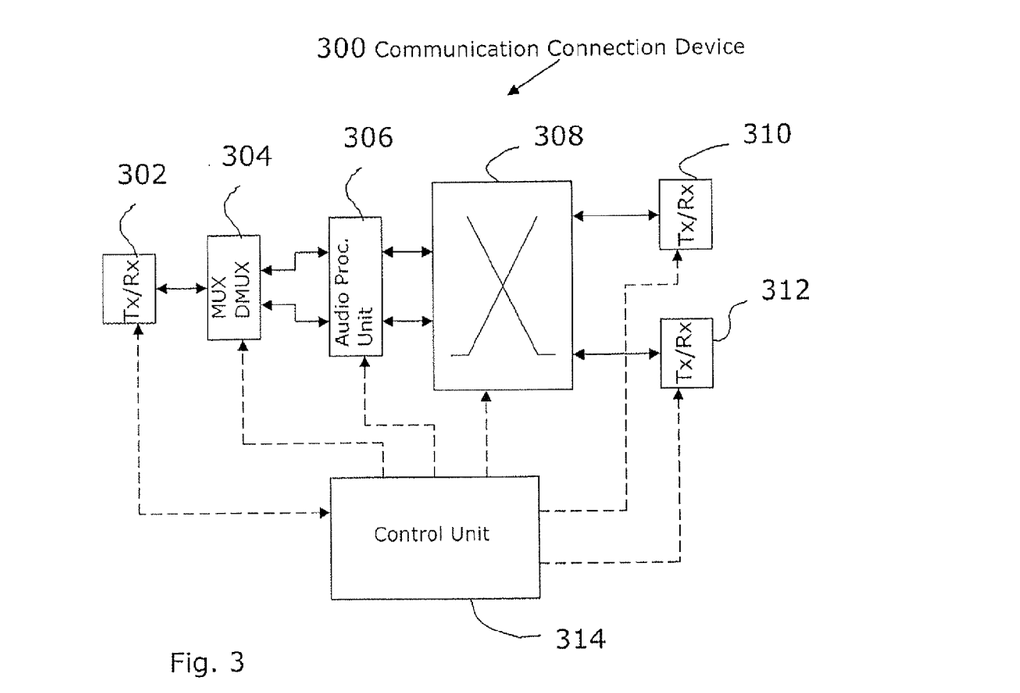
FIG. 3 shows a communication connection device to be engaged in voice communications between a portable communication device according to the present invention and at least two other parties, according to the present invention.
Figure 4:
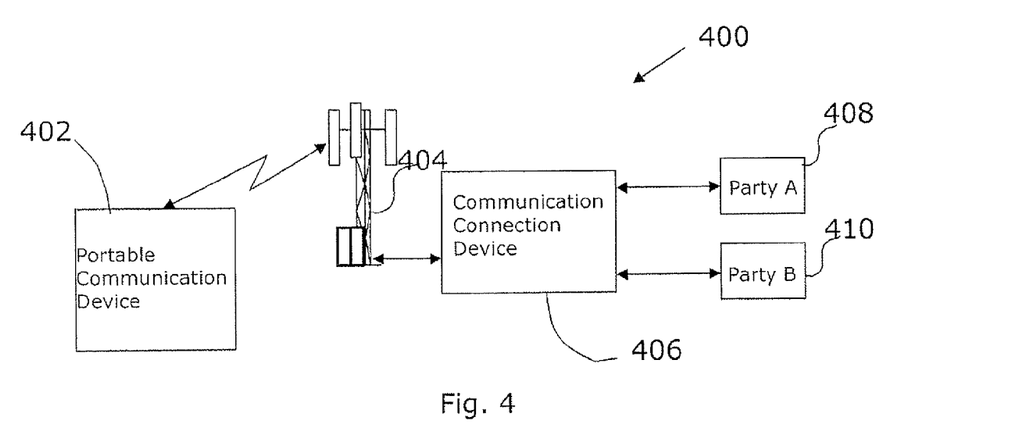
FIG. 4 shows a system of a portable communication device, a communication connection device and two other parties, being engaged in voice communication, according to the present invention.

According to another embodiment of the present invention for engaging a portable communication device with at least two other parties, a communication connection device to be engaged in voice communication is being used. Such a communication connection device is schematically shown in FIG. 3 and is described in relation to FIG. 4, schematically showing a system of a portable communication device, 402, engaged in voice communication with two other parties, 408 and 410, respectively, by using one such communication connection device, 406, where the portable communication device, 402, communicates over the air via a base station, 404, with the communication connection device, 406.

According to this embodiment the control unit, 314, of the communication connection device, 300, determines on which of the comprised transceivers, 310 or 312, audio information is received, when party A, 408, or party B, 410, is providing audio information Having decided if any, and In that case which transceiver is receiving audio information, the control unit, 314, sends control information to a switch core, 308, that is arranged to switch audio information between the connected parties. Upon receipt of control information from a portable communication device, 402, the control unit, 314, sends control information to the audio processing unit, 306, for processing the audio information such that it can be perceived as being positioned at the position of the active party. This processing also involves dividing the audio information in two audio streams and process these streams according to the control information received by the control unit, 314. A preferred processing involves amplitude modulating of said two streams by for instance weighting said two and/or delaying one or the other of said two streams, in relation to each other. Subsequent to this audio processing by the audio processing unit, 306, a multiplexer/demultiplexer, 304, multiplexes the two processed audio streams, into one stream and forwards said stream, based on control information from the control unit, 314, to the transceiver, 302, for subsequent transmission from the base station, 404, to the portable communication device, 402.

Thus by sending control information from the portable communication device, 402, to the communication connection device, 300, 400, processing of audio information from parties being active is performed, such that the processed audio information received by the portable communication device, 402, is perceived as being positioned at a position of the active party.

When the portable communication device is providing audio information, this audio information is received by the transceiver, 302, of the communication connection device, 300, and is subjected to audio processing in the audio processing unit, 306. Unless control information is received from a second portable communication device, according to the present invention, ordering the audio processing unit to divide the audio information in two audio streams and process the divided streams according to received information, the audio information from the first portable device is processed as a single audio stream, for subsequent provision of non-spatial audio information to other connected parties, for instance party A, 408, and party B, 410.

The portable communication device as well as the communication connection device can be used for conference purposes, for which a user of a first portable communication sets up the conference and initiates the connection to the participating parties. In this conference mode every participant can for instance hear what the other participants say.

The mode of operation according to the preferred embodiment is the conference call mode. Another mode of usage is the multiparty call mode, in which several parties are connected to a portable communication device according to the present invention. Here the user of said portable communication device has the ability to choose to talk to or communicate with one or a subset of the parties at a time. The other participants, i.e. the ones not being selected, can hence not hear what the user of the portable communication device says.

The portable communication device according to the present invention can also be used as an alternative to a video conferencing equipment, when participating in a video conference. Then audio information from the other connected parties are treated as described above. Unless a camera is being used by the user of the portable communication device, with which the user is recording himself, the other participating parties can only hear the user of the portable communication device. Moreover, by using a touch-screen in the portable communication device the user can create information by writing and/drawing and send the created information to the other parties participating in the video conference. Alternatively, he can also send video films to the others. On the screen of the portable communication device the other participants of the video conference, are visible.

By using the portable communication device in the multiparty call mode, for instance, a dealer can talk to one customer on one line and to his supplier on another connected line, without the parties knowing about each other.

The portable communication device further offers the user the possibility to make short notes that are linked to the different representations of the parties participating in a conference call or in a multi-party call. For instance a bid from a party can be noted at the position of the representation of said party, to facilitate remembering which one of the parties actually made a certain bid.

The user of the portable communication device may further act as a formal chairman and in such a mode he determines which part is allowed to be heard when speaking, by clicking on a representation of that party on the screen of the portable communication device. The party whose representation was clicked on by the user of the portable communication device, receives a voice prompt "The word is yours" and is allocated a voice channel.

In either of the multiparty call mode or the conference call mode the user of the portable communication device can decide to connect a further party or to disconnect an already participating member. During a conference, the user of the portable communication device is phoned by a fourth party, the user answers the call, and decides to connect this fourth party, after which the conference can proceed having four parties.

As mentioned above, the user can also share information with the connected parties by sending material over MMS or alternatively, by using E-mail. Based on information stored in the memory of the portable communication device or alternatively received from a network, the portable communication device determines how to send the material being distributed. A party that is connected over GSM will receive information via MMS as the preferred choice, whereas if he is connected over landline he will receive said information via E-mail.

The present invention thus makes use of having multiple channels connected simultaneously. As VoIP (Voice over IP) is Introduced the usage of multiple simultaneous channels will increase and the Importance of the present invention will increase.

It is emphasized that this invention can be varied in many ways, of which the alternative embodiments below only are examples of a few. These different embodiments are hence non-limiting examples. The scope of this present invention, however, is only limited by the subsequently following claims.

According to another embodiment of the present invention, one information presentation unit is a touch screen, which also serves as the user input unit.

According to another embodiment of the present invention, the provided audio information does not have to rely on weighted sound in two streams, but rather the audio information can be provided on one channel, serving the user of the portable communication device with sound from a first party by using the left speaker only, with sound from a second by using the right speaker only and with sound from a third party by using both speakers at the same time.

According to yet another embodiment of the present invention, the presentation of sound in audio space can be provided by itself, without the provision of representations in visual space.

According to yet another embodiment of the present invention, the presentation of representations in visual space can be provided by itself, without the provision of sound in audio space.

According to yet another embodiment of the present invention, a user of the portable communication device can select position for the participating parties, by entering coordinates in a coordinate system, such as a Cartesian coordinate system, or entering distance and angles In a polar coordinate system, in relation to the spatial position of his representation.

According to yet another embodiment of the present invention, more than two other parties can participate in the conference call mode or in the multiparty call mode.

According to yet a different embodiment of the present invention, attention is given to the user about which party is being active by delivering signals in vibrational space by vibrating a vibrator of the portable communication device at different intervals and/or with different strengths according to said active party.

With the present invention has thus been described a portable communication device, a method for engaging a portable communication device with parties in voice communication, a communication connection device and a system comprising such portable communication device and communication connection device, having the following advantages:

By using a portable communication device according to the present invention, the user can more easily follow who is saying what, in conference calls and In multiparty calls.

Another advantage of said invention is that the user of a portable conference device can identify the party being active.

Another advantage of said invention is that the network operator receives higher revenues as calls are charged as many calls since several lines are being used.

Yet another advantage with the present invention is that the portable communication device can be used instead of a video conferencing equipment that is expensive, is heavier, is stationary and demands much more of space.

Still yet another advantage is that the invention circumvents the need of a conference bridge or the calling a conference service setting up the conference call. This enables cheaper and more secure in-house conference calls.

The invention claimed is:

1. A method for engaging a portable communication device in voice communication with a plurality of parties, comprising:
    establishing connections between the portable communication device and at least two other parties;
    detecting selection of a position of one of the other parties through input made by a user of the portable communication device;
    positioning the other connected parties at different positions in space in relation to the portable communication device; and
    providing information in relation to the position of one of the other connected parties, when this connected party provides audio information over said connection so that the user of the device can identify which party is active;
    wherein positioning comprises positioning in audio space; and
    wherein providing information comprises providing audio information from said one of the other connected parties processed, based on input made by a user, such that the processed audio information is perceived as being positioned in space at said other party when presented by an information presentation unit.

2. The method according to claim 1, wherein positioning the other connected parties at different positions in space comprises positioning the other connected parties at different positions in visual space.

3. The method according to claim 1, wherein providing information comprises providing visual information on a screen.

4. The method according to claim 1, wherein providing information comprises providing a representation that can be associated with said one of the other connected parties, when said one of the other connected parties provides audio information over said connection.

5. The method according to claim 2, wherein providing information in visual space comprises providing text and/or image information.

6. The method according to claim 4, wherein providing information comprises providing information for actuating the provided representation.

7. The method according to claim 4, wherein providing information comprises providing information for actuating the provided text and/or image information.

8. The method according to claim 1, wherein positioning comprises determining control information to be used when providing processing audio information.

9. The method according to claim 1, wherein providing audio information in space comprises processing said audio information of one of the other parties, such that the processed audio information is perceived as being positioned in space at the position of said other party when presented by the information presentation unit.

10. The method according to claim 9, wherein providing audio information and processing of audio information comprises weighting of two audio streams of said audio information, such that the processed audio information is perceived as being positioned in space at the position of said other party when presented by the information presentation unit.

11. The method according to claim 9, further comprising:
    providing audio information from the portable communication device to at least one of the other parties; and
    processing said audio information including equal weighting of two audio streams of said audio information.

12. A portable communication device configured to engage in voice communication with a number of parties, comprising:
    a communication unit for engaging at least two other parties in voice communication;
    a user input unit configured to receive user input;
    a control unit configured to enable positioning of other connected parties at different positions in space based on input from a user received via the user input unit and configured to detect selection, via the user input unit, of a position of one of the other connected parties,
    at least one information presentation unit for which the control unit is further configured to provide information in relation to the position of one of the other connected parties when said one of the other connected parties is providing audio information over a connection so that the user of the device can identify which party is active;

wherein the control unit, when positioning the other connected parties, is configured to determine control information enabling positioning in audio space, for provision of audio information to be perceived as being positioned at the position of said one of the other connected parties, in space.

13. A portable communication device according to claim 12, further comprising:
an audio processing unit configured to process the audio information from said one of the other connected parties, based on the control information, and forward the processed audio information to at least one information presentation unit, such that the audio information is perceived as being positioned at the position in space of said one of the other connected parties, when presented by the at least one information presentation unit.

14. A portable communication device according to claim 13, wherein the audio processing unit when configured to process the audio information, processes the information so that two differently processed audio streams of said audio information is provided.

15. A portable communication device according to claim 12, wherein the communication unit is further configured to forward said control information to an external processing unit for processing audio information from said one of the other connected parties, said communication unit being configured to receive the processed audio information and forward said processed audio information to an information presentation unit in a format allowing the audio information to be perceived as being positioned at the position in space of said one of the other parties when presented by the at least one information presentation unit.

16. A portable communication device according to claim 12, wherein the at least one information presentation unit comprises at least two speakers, wherein the perceived position in space, of said one of the other connected parties, is related to positions of the speakers.

17. A portable communication device according to claim 12, wherein the control unit, when locating the other connected parties, is configured to determine control information enabling positioning in visual space, for provision of visual information perceived to be at the position in space of said one of the other connected parties.

18. A portable communication device according to claim 17, wherein the control unit is further configured to determine control information for presenting a representation of said one of the other connected parties, by using said at least one information presentation unit.

19. A portable communication device according to claim 18, wherein the control information comprises information for actuating the representation of said one of the other connected parties by using said at least one information presentation unit.

20. A portable communication device according to claim 12, wherein the at least one information presentation unit comprises a screen.

21. A portable communication device according to claim 12, wherein the user input unit comprises a screen that allows the user to input information in the form of "drag and drop."

22. A communication connection device configured to assist voice communications between at least one portable communication device and at least two other parties, wherein said portable communication device receives user inputs, establishes connections between the portable communication device and said other parties, detects selections of positions of the other parties, and determines control information based on the detected selection of position of the other parties from a user, enabling positioning in audio space, said communication connection device comprising:
a transceiving unit configured to receive the control information;
an audio processing unit configured to process, based on the control information received by the transceiving unit from the portable communication device, the audio information of one of the other connected parties when said party is providing audio information, said transceiving unit, being further configured to send such processed audio information to the portable communication device in a format allowing the audio information to be presented such that it is perceived as being positioned at the position in space of said one of the other parties.

23. A communication system, comprising:
at least one portable communication device;
at least two other communication parties;
at least one communication connection device;
wherein the at least one portable communication device is configured to engage in voice communication with at least the two other communication parties of the system, said at least one portable communication device comprising:
a communication unit for engaging the at least two other communication parties in voice communication in said system;
a user input unit configured to receive user input;
a control unit configured to determine control information enabling positioning of the other connected parties of the system at different positions in space based on input from a user of the user input unit; and
at least one information presentation unit for which the control unit is configured to provide processed audio information in relation to the position of one of the other connected parties when said one of the other connected parties is providing audio information over a connection;
wherein said at least one communication connection comprises:
a transceiving unit configured to receive the control information;
an audio processing unit configured to process the audio information of one of the other connected parties when said party is providing audio information based on the control information received by the transceiving unit from the portable communication device;
wherein said transceiving unit is further configured to send such processed audio information to the portable communication device in a format allowing the audio information to be presented such that it is perceived as being positioned at the position in space of said one of the other parties.

* * * * *